US 7,884,757 B2

(12) United States Patent
Mohamadi et al.

(10) Patent No.: US 7,884,757 B2
(45) Date of Patent: Feb. 8, 2011

(54) SCANNING ULTRA WIDEBAND IMPULSE RADAR

(75) Inventors: Farrokh Mohamadi, Irvine, CA (US); Afshin Niktash, Irvine, CA (US)

(73) Assignee: Tialinx, Inc., Newport Beach, CA (US)

( * ) Notice: Subject to any disclaimer, the term of this patent is extended or adjusted under 35 U.S.C. 154(b) by 0 days.

(21) Appl. No.: 11/874,414

(22) Filed: Oct. 18, 2007

(65) Prior Publication Data
US 2009/0102703 A1 Apr. 23, 2009

(51) Int. Cl.
*G01S 7/28* (2006.01)
*G01S 13/00* (2006.01)

(52) U.S. Cl. .......................... 342/175; 342/21; 342/118; 342/134; 342/146; 342/147; 342/157; 342/158; 342/192; 342/193; 342/195; 342/368

(58) Field of Classification Search .................. 342/21, 342/73–81, 118, 128, 130–147, 158, 175, 342/200–204, 368–377, 385–387, 22, 67, 342/27, 28, 82–103, 157, 192–197; 343/700 MS, 343/700 R, 850, 853; 375/130–153
See application file for complete search history.

(56) References Cited

U.S. PATENT DOCUMENTS

| | | | | |
|---|---|---|---|---|
| 4,689,627 A * | 8/1987 | Lee et al. | | 342/373 |
| 5,361,070 A * | 11/1994 | McEwan | | 342/21 |
| 5,757,320 A * | 5/1998 | McEwan | | 342/387 |
| 5,774,091 A * | 6/1998 | McEwan | | 342/387 |
| 5,805,110 A * | 9/1998 | McEwan | | 342/387 |
| 5,912,639 A * | 6/1999 | Beckner | | 342/22 |
| 6,239,741 B1 * | 5/2001 | Fontana et al. | | 342/195 |
| 6,462,696 B1 * | 10/2002 | Gorman | | 342/22 |
| 6,535,161 B1 * | 3/2003 | McEwan | | 342/134 |
| 6,919,838 B2 * | 7/2005 | Santhoff | | 342/22 |
| 7,132,975 B2 * | 11/2006 | Fullerton et al. | | 342/158 |
| 7,209,523 B1 * | 4/2007 | Larrick et al. | | 375/130 |
| 7,312,763 B2 * | 12/2007 | Mohamadi | | 343/853 |
| 7,369,598 B2 * | 5/2008 | Fontana et al. | | 375/130 |
| 2003/0090406 A1 * | 5/2003 | Longstaff et al. | | 342/22 |
| 2003/0090407 A1 * | 5/2003 | Santhoff | | 342/22 |
| 2006/0028374 A1 * | 2/2006 | Fullerton | | 342/67 |
| 2006/0039449 A1 * | 2/2006 | Fontana et al. | | 375/130 |
| 2006/0250299 A1 * | 11/2006 | Falk | | 342/147 |
| 2007/0146207 A1 * | 6/2007 | Mohamadi | | 343/700 MS |

\* cited by examiner

*Primary Examiner*—Bernarr E Gregory
(74) *Attorney, Agent, or Firm*—Haynes & Boone, LLP.

(57) ABSTRACT

In one embodiment, an ultra wide band (UWB) radar includes: a substrate; a plurality of antennas adjacent the substrate, the plurality of antennas being arranged into a plurality of sub-arrays; an RF feed network adjacent the substrate, the RF feed network coupling to a distributed plurality of amplifiers integrated with the substrate, wherein the RF feed network and the distributed plurality of amplifiers are configured to form a resonant network such that if a timing signal is injected into an input port of the RF feed network, the resonant network oscillates to provide a globally-synchronized RF signal across the network; a plurality of pulse-shaping circuits corresponding to the plurality of sub-arrays, each pulse-shaping circuit being configured to receive the globally-synchronized RF signal from the network and process the globally-synchronized RF signal into pulses for transmission through the corresponding sub-array of antennas; and an actuator for mechanically scanning the UWB radar so that the pulses transmitted by the antennas scan across a desired area.

19 Claims, 11 Drawing Sheets

SCANNING ULTRA WIDEBAND IMPULSE RADAR

TECHNICAL FIELD

The disclosure relates generally to radar and more particularly to a scanning ultra wideband (UWB) impulse radar.

BACKGROUND

Ultra wideband (UWB) impulse radar systems utilize pulse widths on the order of hundreds of picoseconds (trillionth of a second). Because such short pulses necessarily have very few cycles or even a single cycle of RF signal (such as a Gaussian monopulse), UWB radars may be considered to operate in the time domain as opposed to conventional frequency domain processing of received pulses. This time domain operation enables UWB radars to enjoy very fine range resolutions such as on the order of a fraction of a few feet or less. In addition, UWB radars have high power efficiency because of their low transmit duty cycle. Moreover, UWB radars provide users with a very low probability of detection because their transmitted pulses occupy a relatively large bandwidth and thus have low power spectral density.

Given their advantages, a great deal of research and development has been dedicated to the subject of UWB radars. For example, see-through-wall UWB radars have been developed that enable users to detect targets such as people on the other side of walls and floors. Such UWB radars are naturally of great interest to military and law enforcement agencies. However, their current range resolution is rather coarse. Moreover, a user typically must physically move the see-through-wall radar to image the contents behind the wall.

Accordingly, there is a need in the art for UWB radars with enhanced range resolution and scanning capabilities.

SUMMARY

In accordance with an embodiment of the invention, an ultra wide band (UWB) radar is provided that includes: a substrate; a plurality of antennas adjacent the substrate, the plurality of antennas being arranged into a plurality of sub-arrays; an RF feed network adjacent the substrate, the RF feed network coupling to a distributed plurality of amplifiers integrated with the substrate, wherein the RF feed network and the distributed plurality of amplifiers are configured to form a resonant network such that if a timing signal is injected into an input port of the RF feed network, the resonant network oscillates to provide a globally-synchronized RF signal across the network; a plurality of pulse-shaping circuits corresponding to the plurality of sub-arrays, each pulse-shaping circuit being configured to receive the globally-synchronized RF signal from the network and process the globally-synchronized RF signal into pulses for transmission through the corresponding sub-array of antennas; and an actuator for mechanically scanning the UWB radar so that the pulses transmitted by the antennas scan across a desired area.

The invention will be more fully understood upon consideration of the following detailed description, taken together with the accompanying drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
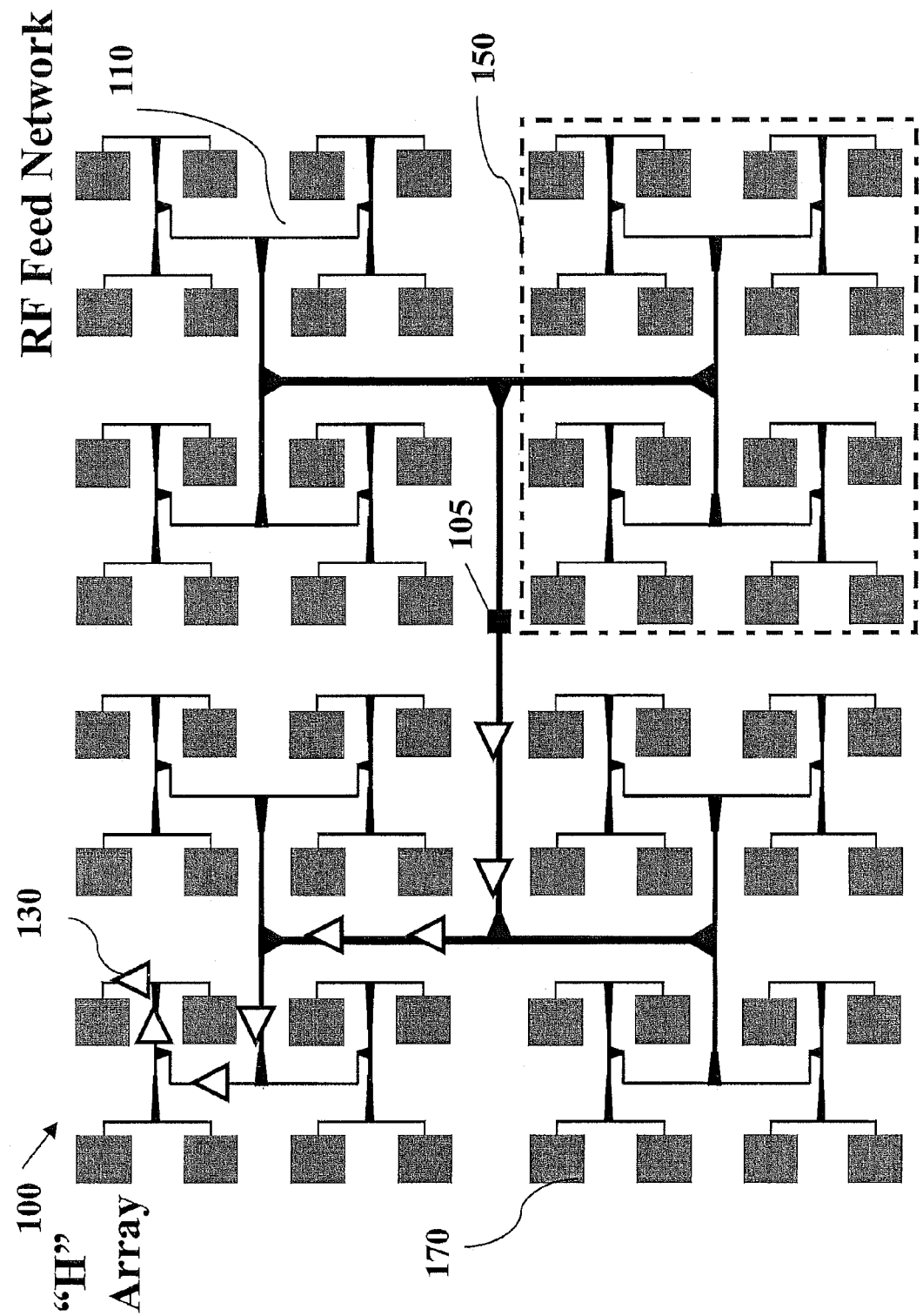
FIG. 1 is a plan view of a portion of a wafer scale antenna module's antenna array and resonant transmitting network.

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

An ultra wideband (UWB) radar is provided that incorporates the pulse shaping advances disclosed in U.S. application Ser. No. 11/555,210, filed Oct. 10, 2006, the contents of which are incorporated by reference, to provide a UWB radar having pulse widths of just tens of picoseconds. Given such extremely narrow pulses, the range resolution is correspondingly enhanced. For example, if a radar is transmitting non-coded pulses, the range resolution is generally around 2.5 times the pulse width times the speed of light in the transmission medium. A UWB radar transmitting 20 picosecond pulses into free space can thus provide a range resolution of just a few millimeters. However, such extremely narrow pulses will be dispersed if transmitted through a transmission network such as a coplanar waveguide (CPW) network before being propagated by the UWB radar's antennas.

To avoid this dispersion, embodiments of the disclosed UWB radar use the distributed oscillator architecture disclosed in U.S. application. Ser. No. 11/536,625, filed Sep. 28, 2006, the contents of which are incorporated by reference. In this fashion, a wafer scale (integrated with a semiconductor wafer) UWB radar is enabled in which a resonant transmission network with distributed amplification is driven by a triggering pulse waveform such that the entire transmission network oscillates acting as a distributed oscillator. Advantageously, the RF signal from the resulting distributed oscillator thereby arrives synchronously at a plurality of integrated antenna circuits coupled to the distributed oscillator. Each integrated antenna circuit may include a modulator such as the pulse shaping circuit disclosed in U.S. application Ser. No. 11/454,915, filed Jun. 16, 2006, the contents of which are incorporated by reference. In this fashion, ultra wideband pulses may be propagated from the resulting wafer scale antenna module without incurring dispersion caused by propagation of the pulses through a transmission network. Significantly, however, such ultra wideband pulses may be generated without the need for oscillators such as a voltage controlled oscillator (VCO) in each integrated antenna circuit.

As set forth in U.S. application Ser. No. 11/536,625, a particularly advantageous transmission network with regard to a wafer scale approach is a coplanar waveguide (CPW) network. Although embodiments of the disclosed UWB radar include the use of any suitable architecture for a transmission network such as CPW, microstrip, and planar waveguide, CPW enjoys superior shielding properties over microstrip. Thus, the following discussion will assume without loss of generality that the transmission network is implemented using CPW. This network may be arranged in an "H" array such that the electrical length from an RF input port to any given integrated antenna circuit is the same as that to all the remaining integrated antenna circuits. Although CPW has superior shielding properties, the RF propagation across a CPW network on a semiconductor wafer such as an 8" wafer may introduce losses as high as 120 dB. To counteract such losses, a plurality of distributed amplifiers may be coupled to the CPW network as disclosed in U.S. application Ser. No. 11/141,283, filed May 3, 2005, now U.S. Pat. No. 7,312,763. For example, a first linear transistor amplifier (which may be denoted as a driving amplifier) amplifies a received RF signal into a length of the CPW network into a second linear transistor amplifier (which may be denoted as a matching amplifier) configured to match its output impedance to the characteristic impedance of the CPW network. Both the gain of the driving amplifier and the gain and the output impedance of the matching amplifier are tuned using reactive loads such as integrated inductors. In this fashion, resistive losses are minimized. These gains may be maintained so that linear operation is achieved. In this fashion, an RF signal driven into an input port of the CPW network is linearly amplified and propagated to the integrated antenna circuits, despite the transmission line losses.

As disclosed in U.S. application Ser. No. 11/536,625, it has been observed that the combination of the resulting active devices and the transmission network can be tuned to form a resonant network. Because the network is resonant, a globally-synchronized oscillation can be induced by triggering the network with an appropriate timing signal. The distributed amplifiers thus injection lock to each other such that the resonant network forms a distributed oscillator providing each antenna with a globally synchronized RF signal. This RF signal may then be modulated if desired such as through the pulse shaping circuit of U.S. application Ser. No. 11/454,915. In addition, the RF signal received at the antennas may be phase shifted for beamforming purposes using a phase shifter such as the analog phase shifter in U.S. application Ser. No. 11/535,928, filed Sep. 27, 2006 (the contents of which are incorporated by reference) or any other suitable phase shifter such as disclosed in U.S. Application. No. 11/182,344, filed Jul. 15, 2005, now U.S. Pat. No. 7,321,339.

Turning now to FIG. 1, a resonant half-duplex transmission network 110 for an 8×8 subarray of antenna elements 170 is implemented in an 8" wafer scale radar module 100. The triggering signal to trigger the resonant oscillation is injected into a center feed point 105. Distributed amplifiers 130 coupled to the network then injection lock to each other such that each antenna 170 may receive a globally synchronized RF signal. The transmission network may be single-ended or differential. In one embodiment, the network may comprise a coplanar waveguide (CPW) having a conductor width of a few microns (e.g., 4 microns). With such a small width or pitch to the network, an array of antenna elements may be readily networked in an 8 inch wafer substrate for, for example, 60 GHz operation.

The design of the distributed amplifiers is not critical so long as they provide sufficient amplification and achieve a resonant operation with the transmission network. Thus, it will be appreciated that the distributed amplifiers may comprise the driving/matching amplifiers discussed below or alternative distributed amplifiers may be used as discussed in U.S. application Ser. No. 11/536,625.

The integration of the CPW network and the distributed amplification into a wafer scale integrated radar antenna module (WSAM) may be better understood by classifying the WSAM into three layers. The first layer would be a semiconductor substrate, such as silicon. On a first surface of the substrate, antennas such as patches for the integrated antenna circuits are formed as discussed, for example, in U.S. Pat. No. 6,870,503, the contents of which are incorporated by reference herein. FIG. 1 is a plan view of an example 8×8 array of patches 170. Active circuitry for the corresponding integrated antenna circuits that drive these antennas are formed on a second opposing surface of the substrate. The CPW transmission network is formed adjacent this second opposing surface. The second layer would include the antennas on the first side of the substrate whereas the third layer would include the CPW network. Thus, such a WSAM includes the "back side" feature disclosed in U.S. application Ser. No. 11/384,589, filed Mar. 20, 2006, now U.S. Pat. No. 7,548,205, the contents of which are incorporated by reference, in that the active circuitry and the antennas are separated on either side of the substrate. In this fashion, electrical isolation between the active circuitry and the antenna elements is enhanced. Moreover, the ability to couple signals to and from the active circuitry is also enhanced. As discussed in U.S. application Ser. No. 11/384,589, a heavily doped deep conductive junction through the substrate couples the active circuitry to vias/rods at the first substrate surface that in turn couple to the antenna elements. Formation of the junctions is similar to a deep diffusion junction process used for the manufacturing of double diffused CMOS (DMOS) or high voltage devices. It provides a region of low resistive signal path to minimize insertion loss to the antenna elements.

Upon formation of the junctions in the substrate, the active circuitry may be formed using standard semiconductor processes. The active circuitry may then be passivated by applying a low temperature deposited porous SiOx and a thin layer of nitridized oxide ($Si_xO_yN_z$) as a final layer of passivation. The thickness of these sealing layers may range from a fraction of a micron to a few microns. The opposing second surface may then be coated with a thermally conductive material and taped to a plastic adhesive holder to flip the substrate to expose the first surface. The substrate may then be back ground to reduce its thickness to a few hundreds of micrometers.

An electric shield may then be sputtered or alternatively coated using conductive paints on background surface. In addition, parts of the shield form ohmic contacts to the junctions. For example, metallic lumps may be deposited on the junctions. These lumps ease penetration of the via/rods to form ohmic contacts with the active circuitry.

In an alternative embodiment, the CPW network may be integrated on the antenna side of the substrate. Because the backside approach has the isolation and coupling advantages described previously, the following discussion will assume without loss of generality that the RF feed network is integrated with the substrate in a backside embodiment. The resulting WSAM may include phase-shifters as discussed in U.S. application Ser. No. 11/454,915 so that electronic beam-steering may be performed. To provide a scanning UWB radar without the expense and complication of electronic phase-shifters, the following discussion will be directed to physically-scanned UWB WSAM radars. It will be appreciated, however, that the UWB WSAM radars disclosed herein may include phase-shifters such as described in U.S. application Ser. No. 11/535,928, the contents of which are incorporated by reference.

Figure 2:
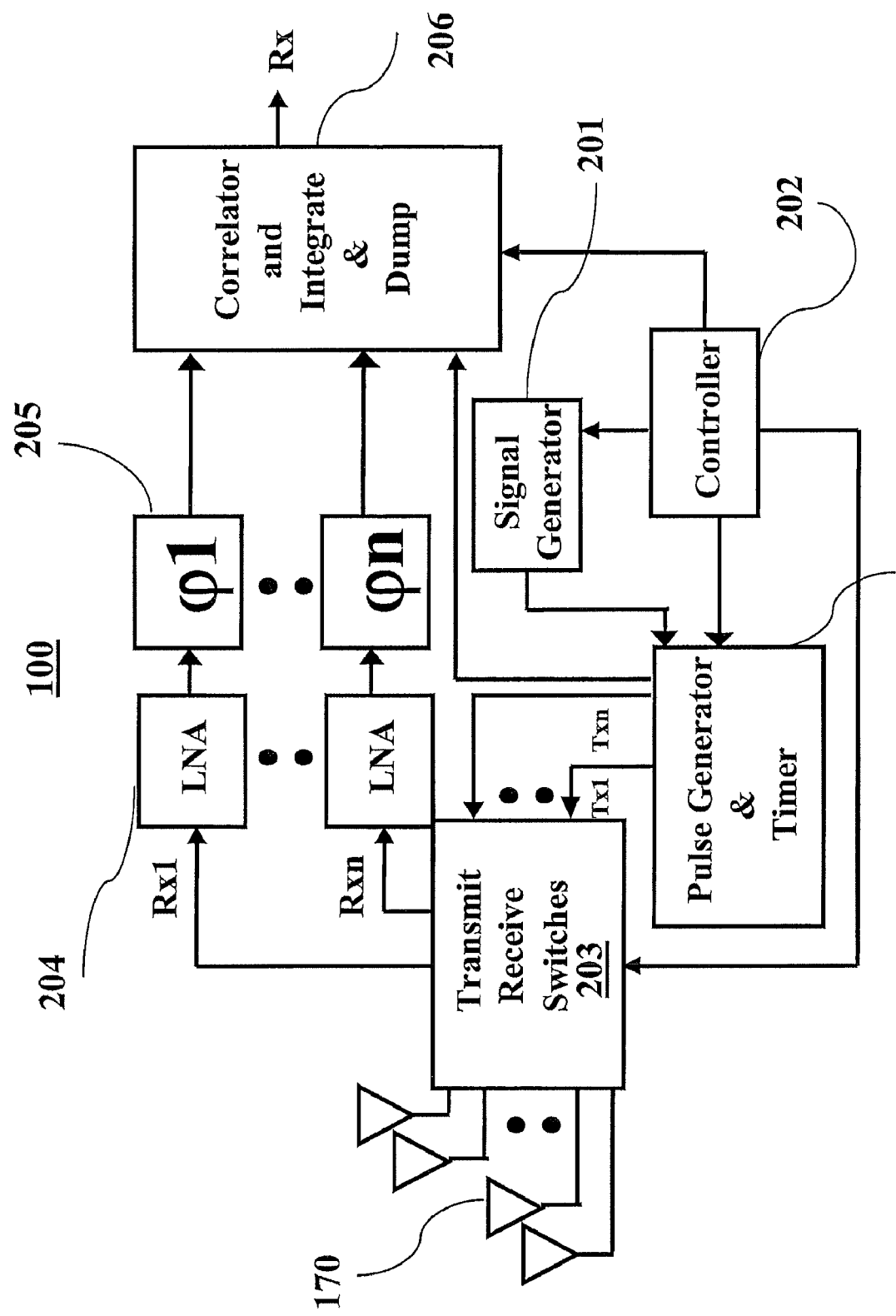
FIG. 2 is a block diagram of an example UWB wafer scale antenna module (WSAM) radar.

A simplified block diagram of an example UWB WSAM radar 100 is illustrated in FIG. 2. The distributed oscillator transmission line is represented by signal generator 201 which drives an UWB pulse shaping circuit 210 under the control of a controller 202. An example distributed oscillator transmission line and UWB pulse shaping circuit are discussed in U.S. application Ser. No. 11/555,210. It will be appreciated that WSAM 100 does not illustrate a full array of antennas as discussed with regard to FIG. 1 for illustration clarity. With regard to such a full array, a pulse shaping circuit may be dedicated for each antenna. Alternatively, the antennas may be organized into sub-arrays such as sub-array 150 such that each sub-array is driven by its own pulse-shaping circuit. As discussed in U.S. application Ser. No. 11/555,210, the pulse-shaping circuit may receive the globally-synchronized oscillating signal from the resonant transmission line and initially rectify and level-shift the signal through amplification in a rectifying-and-level-shifting amplifier driven in a saturation mode rather than in a linear mode. The resulting signal from the amplifier may then be driven through a plurality of delay lines. The delay lines each have a different delay and may be implemented, for example, though sections of CPW transmission line of differing widths. The delay lines are then received by a combining amplifier driven in the saturation mode. Each delay line may be selectable by coupling to the combining amplifier through a transistor switch. Alternatively, the delay lines may be non-selectable. It will be appreciated that a pulse-shaping circuit having selectable delay lines may modulate pulse position through an appropriate combination of the delay lines. In this fashion, coded transmissions may be achieved to enable a plurality of separate channels. However, a fixed-delay pulse-shaping circuit will be less complex and thus less costly to manufacture.

To allow the same antennas 170 to be used for both transmitting and receiving the resulting UWB pulses, pulse shaping circuit 210 couples to its antenna(s) 170 through transmit/receive switches 203. Operation of WSAM 100 may be better understood with regard to FIG. 3, which illustrates the shaped pulses being generated by pulse shaping circuit 210. For example, if the pulse shaping circuit is designed to operate on the harmonic of a 30 GHz distributed oscillator signal provided by signal generator 201, shaped pulses may be generated at a 60 GHz rate. Controller 202 controls a timer associated with, for example, pulse generator 210 to drive switches 203 such that only every nth shaped pulse is transmitted. Thus, the transmitted pulse repetition rate is considerably slower than the shaped pulse rate. For example, if the shaped pulses are generated at a 60 GHz rate, the transmitted pulse repetition rate may be only 3 to 4 GHz. By varying the time separation between pulses (making n larger), the pulse repetition rate may be changed as desired. The WSAM monitors time/range resolution bins at the pulse shaping rate. For example, if the pulses are generated at 60 GHz, the time bins illustrated in FIG. 3 each have an extent of the corresponding 60 GHz period. In general, if every nth pulse from the pulse shaping circuit is transmitted, then n−1 time bins may be monitored by WSAM 100 for targets. Alternative time bin configurations may be used to detect targets.

Figure 3:
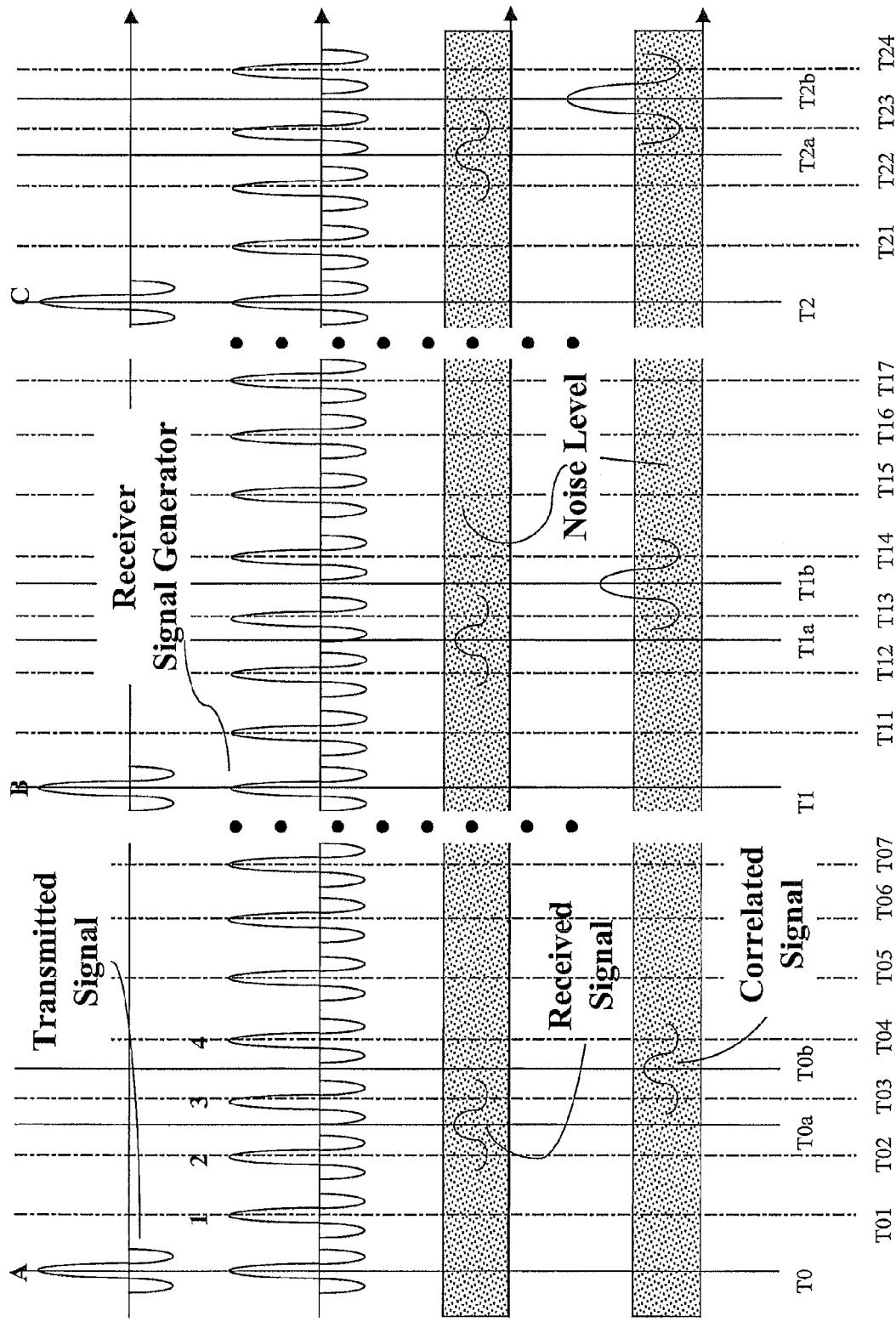
FIG. 3 illustrates various transmitted and received waveforms for the WSAM of FIG. 2.
Figure 4:
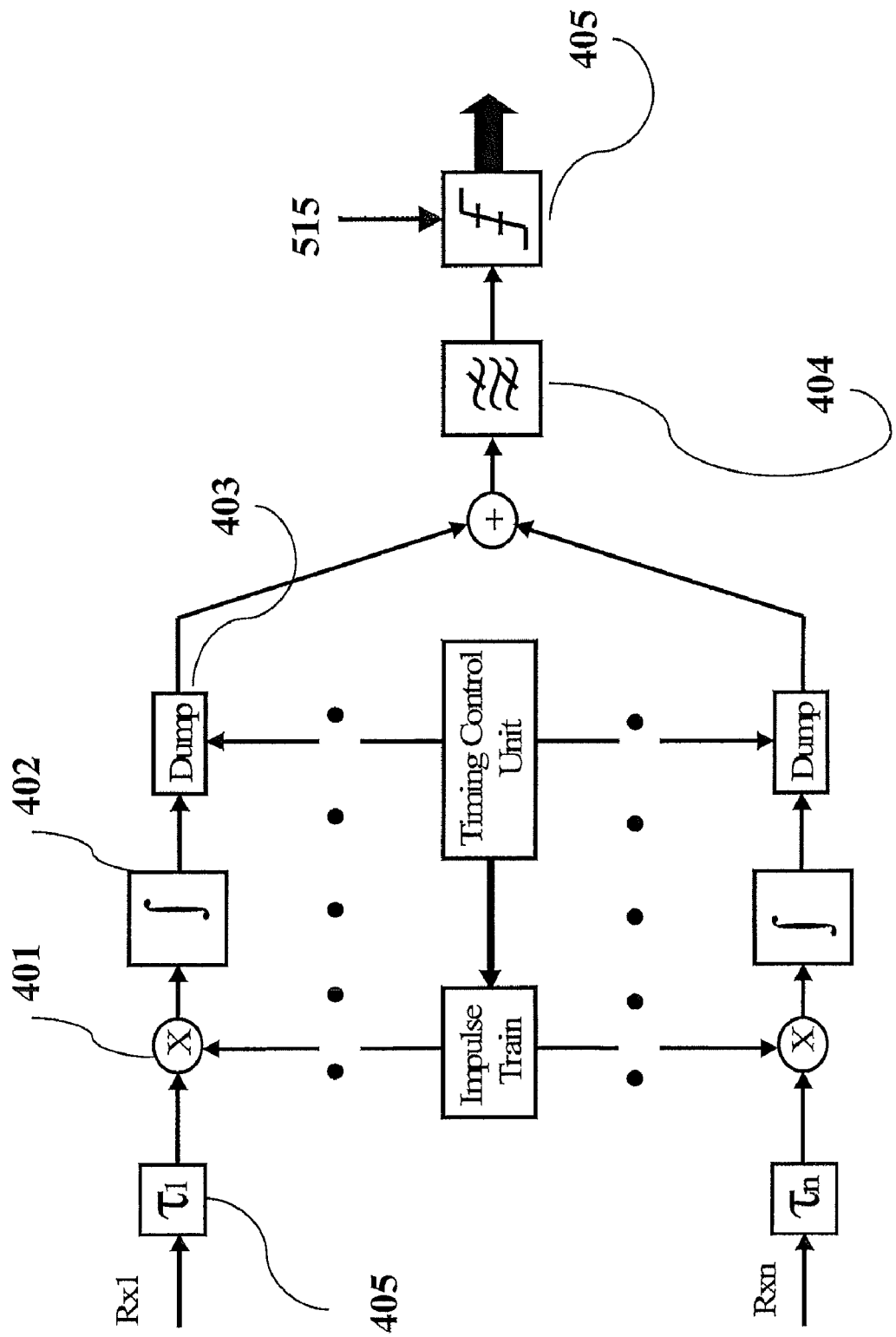
FIG. 4 is a conceptual illustration of the n receiving channels in the WSAM of FIG. 2.

To form the time bins, WSAM may include n−1 channels to process the received RF signal from the antennas. Each channel may include its own low noise amplifier 1304 and phase-shifter 205. As discussed previously, inclusion of phase-shifters 205 is optional to enable an electronically-steered embodiment. A correlator and integrate and dump circuit 206 processes the n channels as shown in FIG. 4. The appropriate amount of delay is introduced by delay circuits 405, which may be constructed using, for example, CPW transmission line segments of the appropriate length to introduce the desired amount of delay. Each correlation is performed using, for example, multipliers 401 such as Gilbert cells. Consider an embodiment having 16 channels: referring to FIG. 3, a first pulse 1 after the transmitted pulse is used in the correlator for channel 1/time bin 1, a second pulse 2 after the transmitted pulse is used in the correlator for channel 2/time bin 2, and so on. Each delay circuit is tuned to delay the appropriate amount of delay corresponding to its channel's time bin. FIG. 3 illustrates how the resulting received and correlated signals are within the noise level and thus undetectable after the first correlation after a transmitted pulse A. However, subsequent correlations and integration in integrators 402 of FIG. 4 will pull the correlated signal out of the noise as seen after transmitted pulses B and C in FIG. 3. In this fashion, the signal-to-noise in the combined signal after sufficient integrations from dump circuits 403 will be sufficient for detection of targets. The channels may be combined and processed through a bandpass filter 404 and an analog-to-digital converter 405.

Referring again to FIG. 1, a receiving CPW network may be formed analogously as shown for network 110. This receiving CPW network may incorporate linear distributed amplification and phase shifting as discussed, for example, in U.S. application Ser. No. 11/535,928, the contents of which are incorporated by reference. The n channels may then be formed from a received signal at an output port analogous to input port 105. In that regard, the correlation and integration and dump processing may be performed externally to the WSAM or may be integrated with the WSAM. In an alternative embodiment, each antenna or sub-array of antennas may associate with its own correlation and integration and dump processing circuit such that each antenna or sub-array of antennas provides a received signal that is processed through its own versions of the n channels/time bins. Such an embodiment would not have the dispersion introduced by propagation through a CPW receiving network. However, dispersion is not problematic through a receiving network because detection for any given time bin is based upon a peak signal level and thus not that sensitive to spreading of rising and falling times for the received pulses.

Figure 5:
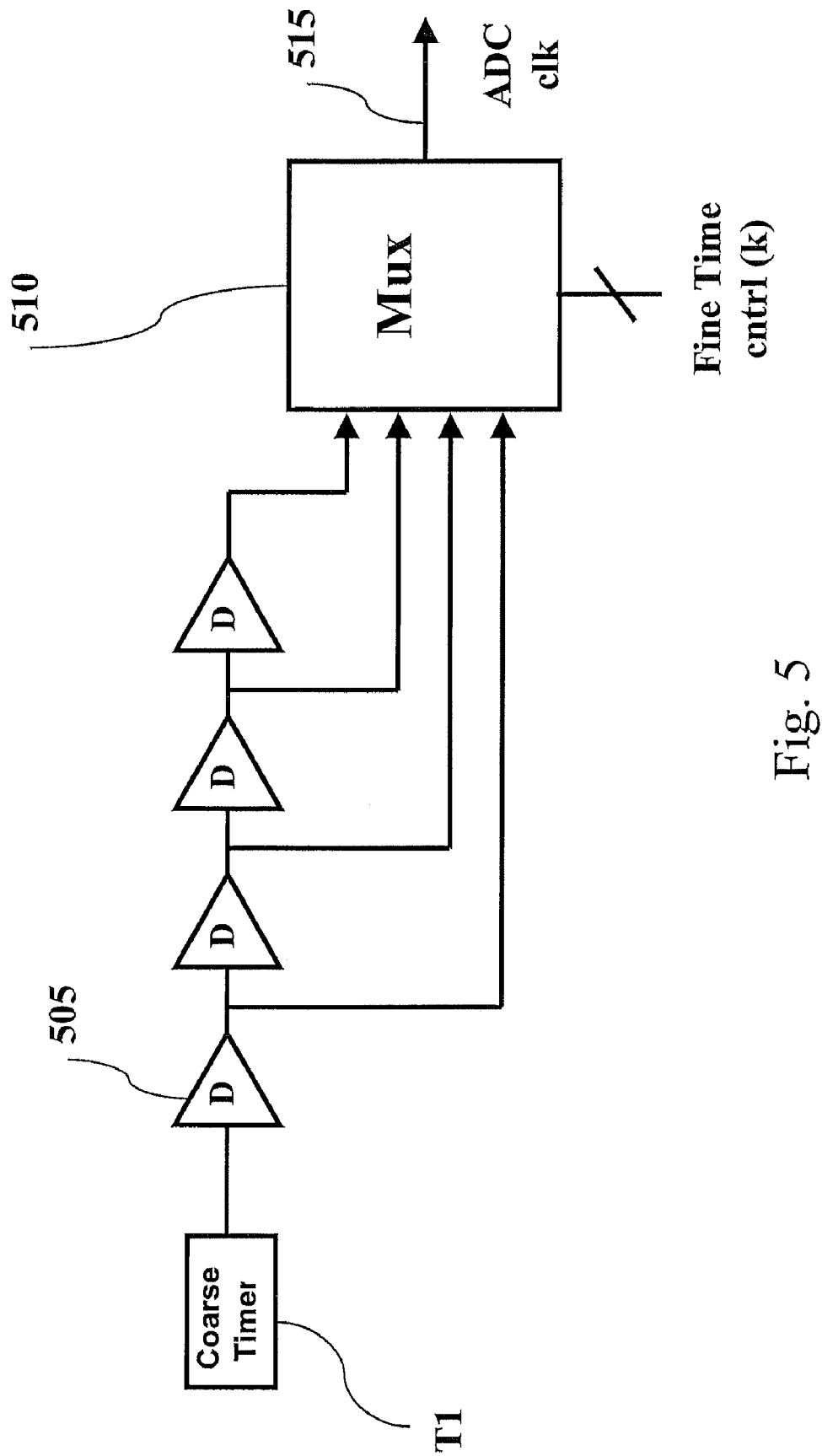
FIG. 5 illustrates an analog-to-digital clock source to clock the analog-to-digital converter of FIG. 2.

The digitization of the received pulses through ADC 405 must address the following issue: pulse widths of just tens of pico-seconds require extremely high sampling frequencies in the ADC to provide an adequate (such as at a Nyquist rate) sampling of the received pulses. Should signal generator 201 be oscillating at 20-30 GHz and pulse shaper 210 shaping a harmonic such that 60 GHz pulse trains are produced, a proper sampling of each pulse may require greater than a 100 GHz sampling rate in ADC 405. Such a high sampling rate would be required to differentiate multiple reflections from objects in close proximity of each other. To relax the required sampling rates yet achieve high resolution, the following pulse-to-pulse sampling scheme may be practiced. As known in the art, an analog-to-digital converter is triggered by a clock signal such that in response to a rising (or falling) clock edge in the clock signal, an analog-to-digital converter samples its input signal and converts the sample into a digitized value. In the following scheme, the ADC clock is adjusted such that ADC 405 takes successive samples on a pulse-to-pulse basis rather than taking multiple samples with regard to a single pulse. For example, an ADC clock 500 may be generated as seen in FIG. 5. A coarse timer T1 cycles at approximately the pulse repetition frequency for the UWB WSAM it will be associated with. A plurality of delay circuits 505 successively delay the clock signal provided by the coarse timer T1. Each delay circuit 505 may constructed analogously as discussed with regard to delay circuits 405. A multiplexer 510 selects from the output signals from the various delay circuits to provide an ADC clock 515. A controller (not illustrated) would act as a counter in that it would successively change a fine time control signal to increment from a delay circuit to a successive (or multiply-successive) delay circuit. For example, if each delay circuit represents a delay of n pico-seconds (n being some real number), the successive samples from ADC 405 in response to being clocked by ADC clock 515 will be successively delayed in time with regard to the pulse repetition frequency by n pico-seconds each. It will be appreciated that timer T1 may be operated at sub-harmonics of the pulse repetition frequency (PRF). For example, if timer T1 clocks at a rate one-half of the PRF, ADC 405 will be sampling every other pulse. In this fashion, the specifications of the ADC may be further relaxed.

Figure 6:
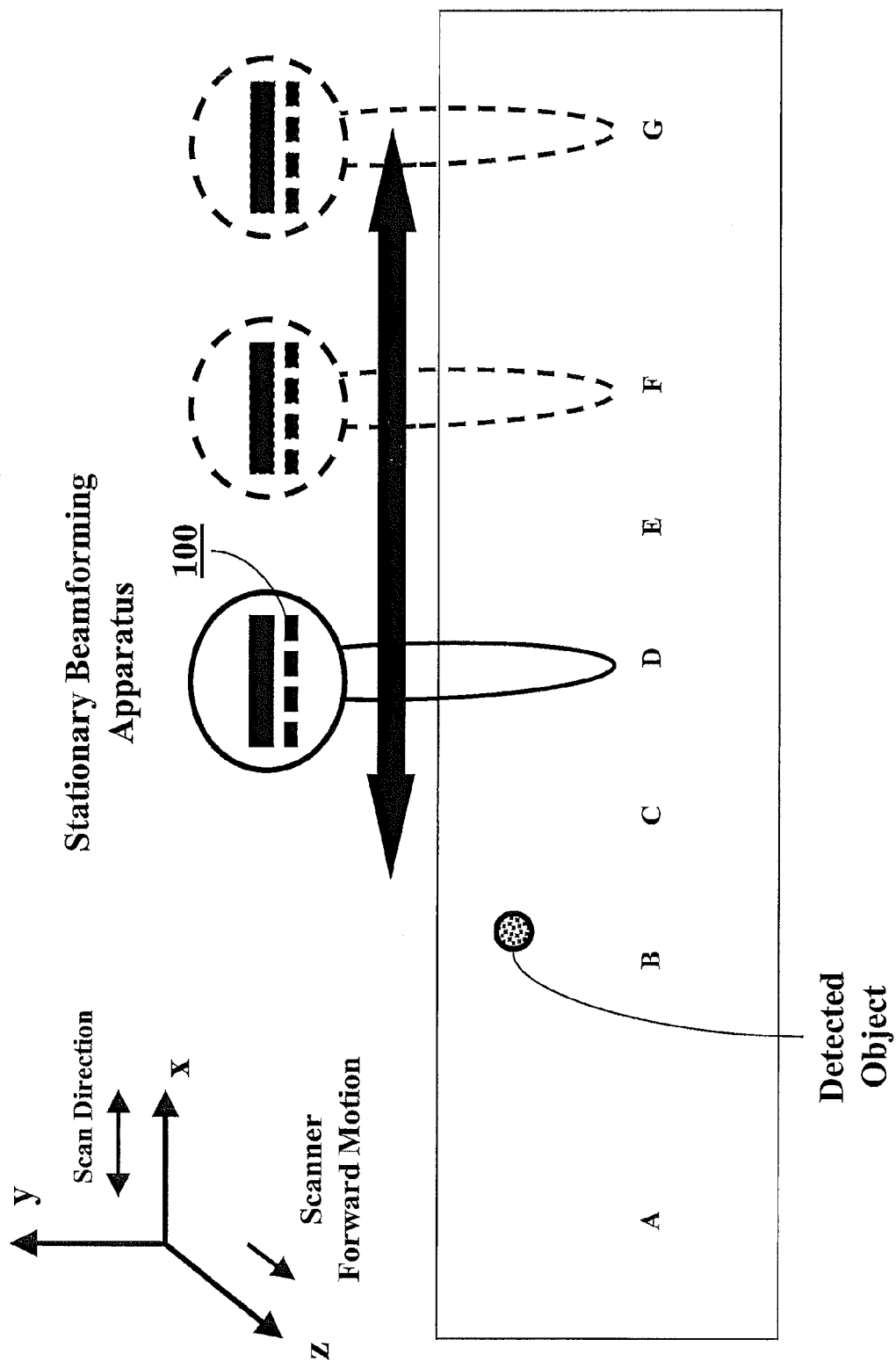
FIG. 6 illustrates a linearly-actuated mechanical scanner for a WSAM.
Figure 7:
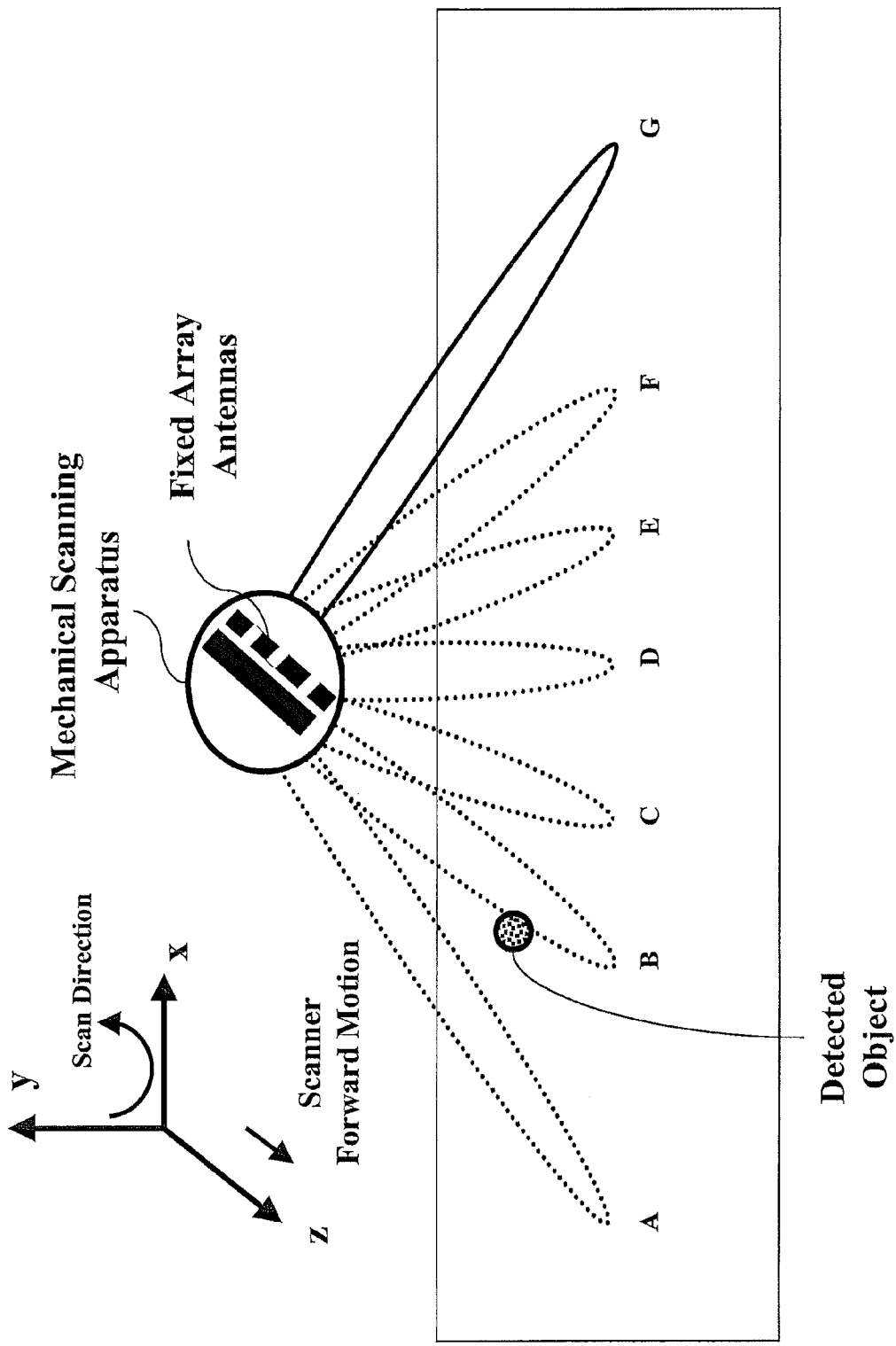
FIG. 7 illustrates a rotary-actuated mechanical scanner for a WSAM.

As discussed previously, WSAM embodiments that do not include phase-shifters in either the transmission or receive paths will not be able to electronically steer their beams but will be less costly to design and manufacture. Such WSAMs may still be mechanically steered in a number of embodiments. For example, turning to FIG. 6, a WSAM 100 may be attached to a linear rail or guide and actuated to translate along this rail. A linear sweep of the resulting beam will thus translate according to the translation of the WSAM. With regard to FIG. 6, this linear translation is defined to be in the x-direction. By performing such a linear translation of the WSAM 100 in this x-direction and then translating in a z-direction, successive scans may cover a given area to be search for targets. Rather than linearly translate a WSAM to perform a mechanical scan, a WSAM 100 may be rotated about an axis (such as the z axis) as illustrated in FIG. 7 to perform a linear scan with regard to the x-direction. The WSAM may then be translated in the z-direction to perform successive scans as discussed with regard to FIG. 6.

Figure 8:
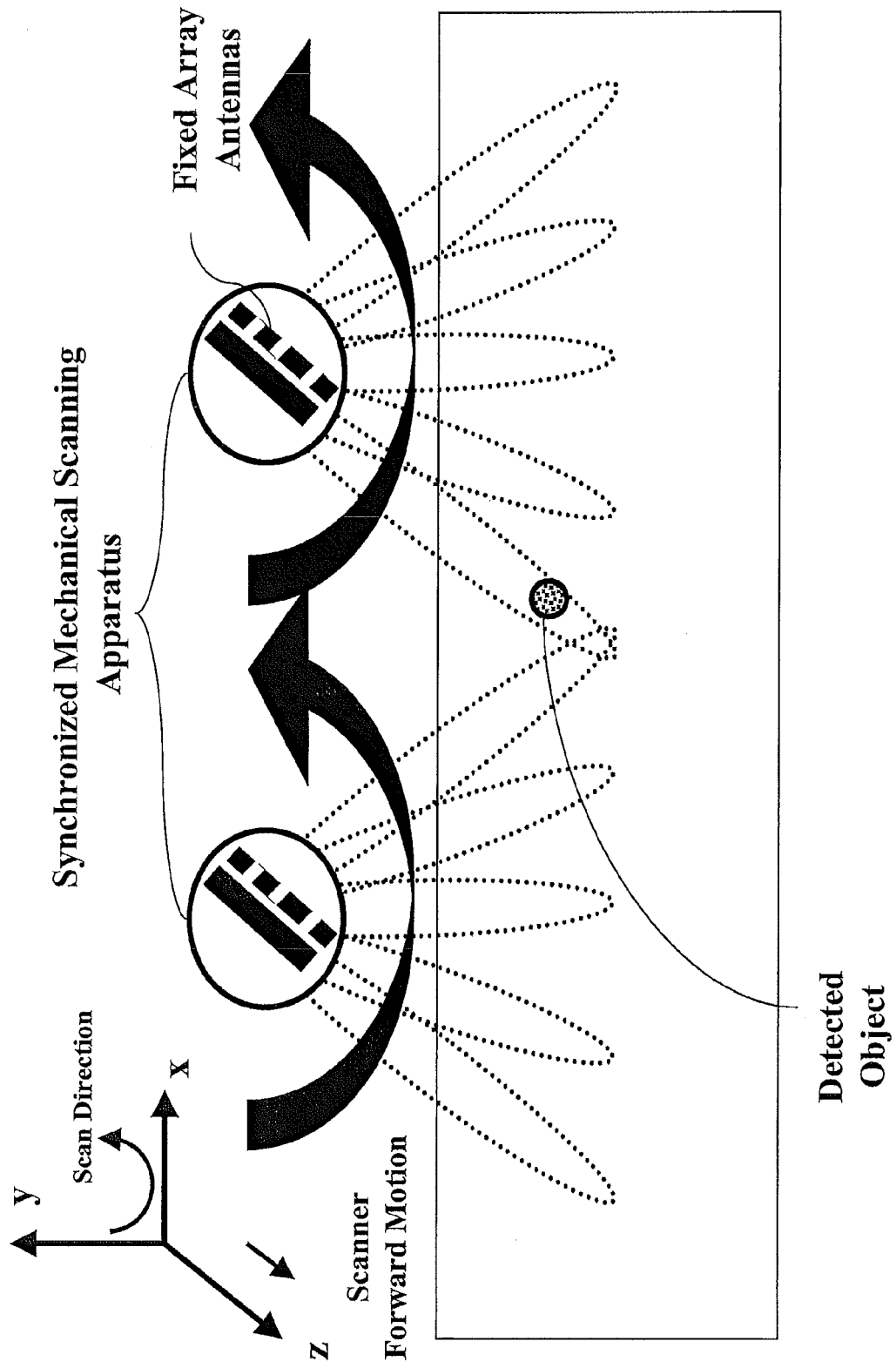
FIG. 8 illustrates two rotary-actuated WSAM that scan in a synchronous fashion.
Figure 9:
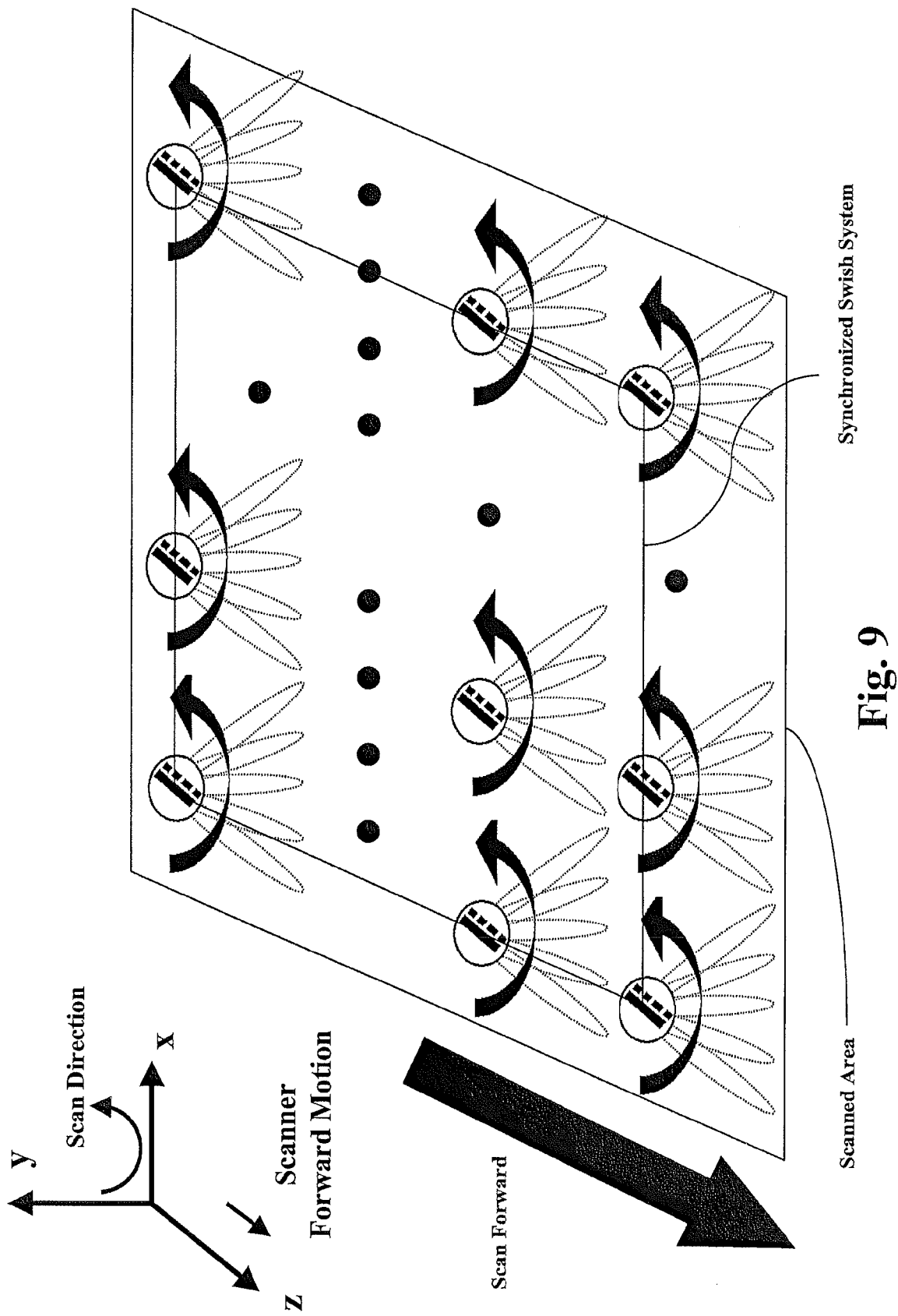
FIG. 9 illustrates a plurality of synchronized rotary-actuated WSAMs being translated so as to scan a desired area.
Figure 10:
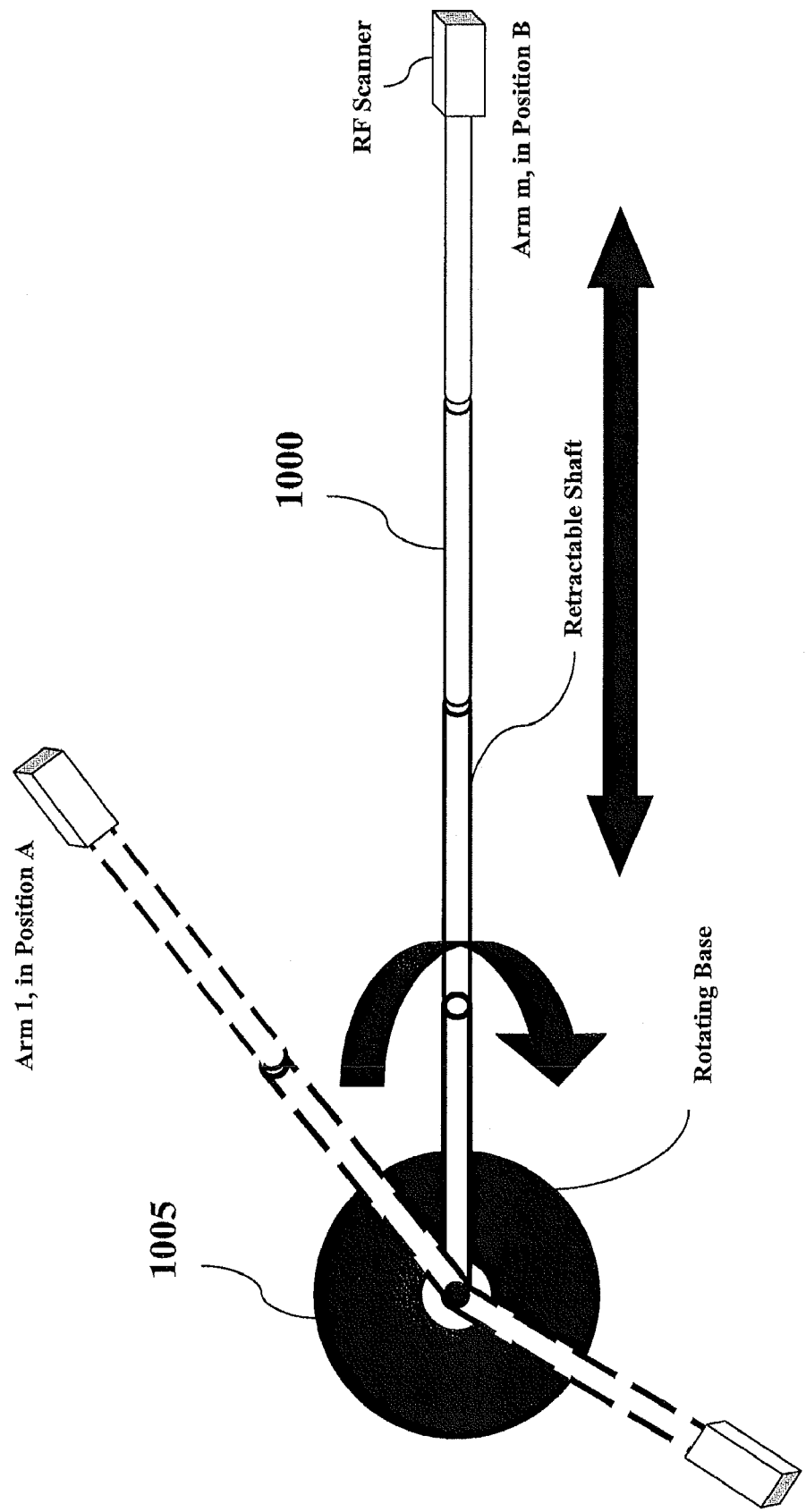
FIG. 10 illustrates a retractable shaft or boom adapted to hold a WSAM for mechanical scanning.

To increase the scanning speed with respect to a given area, multiple WSAMs may be coordinated to rotate about parallel fixed axes as shown in FIG. 8. In that regard, WSAMs 100 in FIG. 8 would rotate in a coordinated "windshield washer" fashion so that a given linear scan is performed over twice the length in the same time as would a comparable scan discussed with regard to FIG. 7. A plurality of WSAMs may be coordinated to rotate about parallel axes as shown in FIG. 9. Consider the utility of such an arrangement: these multiple WSAMs could be arranged with regard to a rail or frame that spans, for example, a road to be searched for improvised explosive devices. The frame would be affixed to a vehicle (either manned or unmanned) and driven at an appropriate speed so that the road could be scanned as shown in FIG. 9. An alternative embodiment is shown in FIG. 10 for a WSAM 100 mounted on a retractable shaft 1000. Shaft 1000 may be mounted on a pivot 1005 within a vehicle (not illustrated). In this fashion, shaft 1000 may extend laterally from the vehicle and be positioned as desired to search for targets such as buried improvised explosive devices. It will be appreciated that the mechanically scanning disclosed herein need not be performed in two-dimensions but may also involve movement of the impulse radar in all 3 dimensions.

Figure 11:
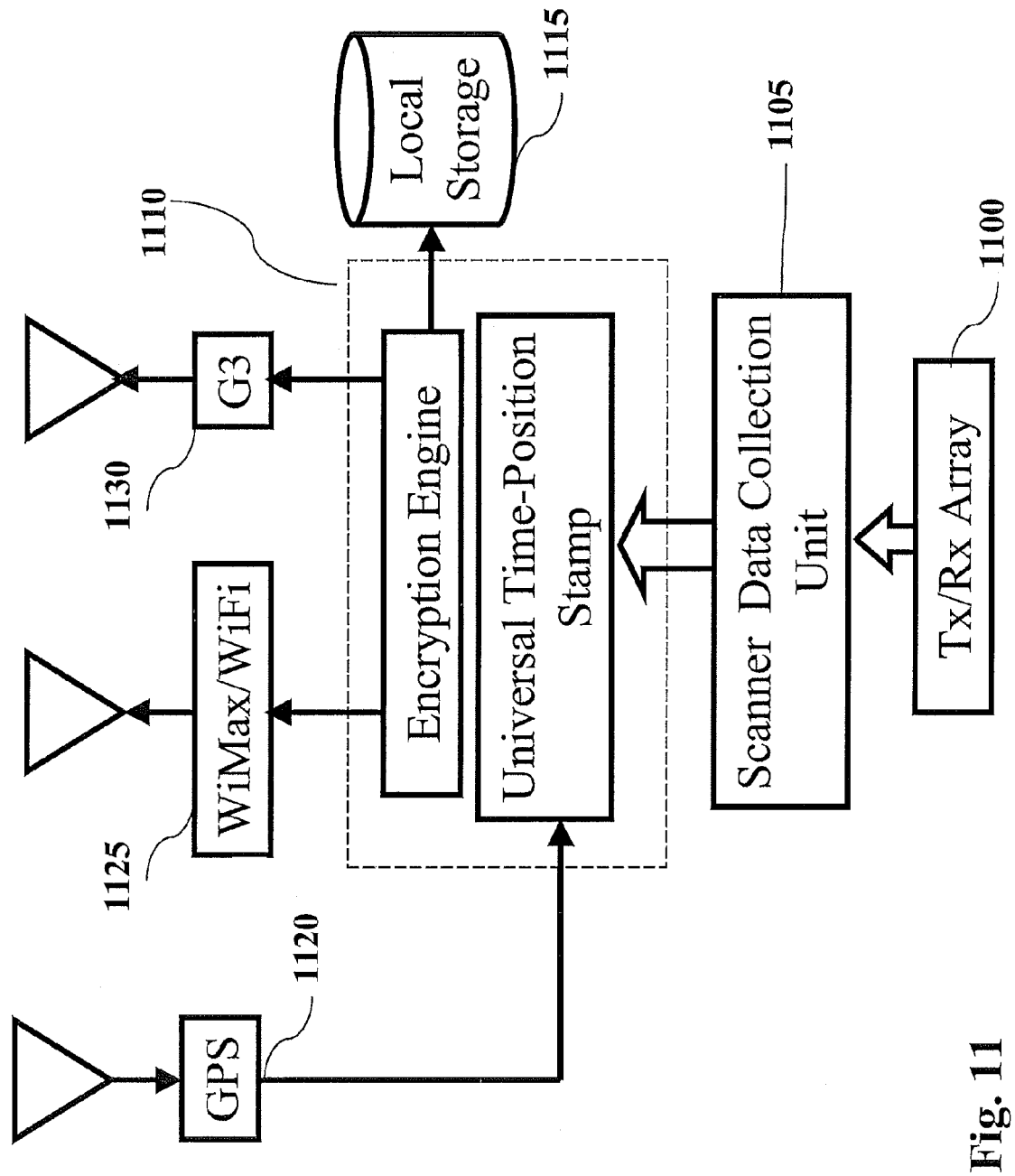
FIG. 11 illustrates a block diagram of a communication interface for an impulse radar according to an embodiment of the invention.

Regardless of whether an impulse radar is electronically or mechanically scanned, it will gather information that a processor may search for targets. A wireless communications interface for the transfer of such information is illustrated in FIG. 11. A WSAM (or non-wafer scale) radar such as discussed with regard to FIG. 2 is represented by a transmit/receive array 1100 and a scanner data collection unit 1105. These elements may be integrated with a communication interface module 1110 and a local memory 1115. The communication interface may include a Global Positioning System (GPS) receiver 1120 so that collected radar data may be time and/or positioned stamped. The position stamping should also account for the scanning posture of the impulse radar—for example, with reference to FIG. 7, the GPS location locates the impulse radar in the x, y, and z dimensions. This location must then be correlated with the current scan angle so that the collected data may be properly located in space. For example, depending upon the scan angle, the impulse radar is interrogating locations A through G in FIG. 7. The tagged collected radar data may then by encrypted and transmitted to a suitable radar processor using, for example, an 802.11 interface 1125 (such as WiMax or WiFi). Alternatively, the tagged data (which may be encrypted) may be transmitted to a radar processor through a cellular telephone interface such as a G3 interface 1130. Note the advantages of such a wireless interface: the radar may then be built in a very compact integrated circuit (or wafer scale) package. It is then suitable for mounting on ultra light unmanned aerial vehicles such as remote-controlled helicopters to scan for targets.

There are additional advantages of the embodiments disclosed herein. An integrated (and thus low cost) solution is provided that enables millimeter range resolution and beam-forming capabilities. Although the UWB radars discussed herein have been described with respect to particular wafer scale embodiments, this description is only an example of certain applications and should not be taken as a limitation. For example, an UWB radar having a globally-synchronized oscillating signal being pulse shaped through corresponding pulse-shaping circuits may be implemented in an integrated circuit that is not wafer scale but rather merely diced from a wafer. Moreover, rather than use a resonant transmission line to drive the pulse-shaping circuit(s), an oscillator such as a VCO may drive an oscillating signal through a transmission network to the various pulse-shaping circuit(s). Consequently, the scope of the claimed subject matter is set forth as follows.

We claim:
1. An ultra wide band (UWB) radar, comprising:
a substrate;
a plurality of antennas adjacent the substrate, the plurality of antennas being arranged into a plurality of sub-arrays;
an RF feed network adjacent the substrate, the RF feed network coupling to a distributed plurality of amplifiers integrated with the substrate, wherein the RF feed network and the distributed plurality of amplifiers are configured to form a resonant network such that if a timing signal is injected into an input port of the RF feed network, the resonant network oscillates to provide a globally-synchronized RF signal across the network;

a plurality of pulse-shaping circuits corresponding to the plurality of sub-arrays, each pulse-shaping circuit being configured to receive the globally-synchronized RF signal from the network and process the globally-synchronized RF signal into pulses for transmission through the corresponding sub-array of antennas; and an actuator for mechanically scanning the UWB radar so that the pulses transmitted by the antennas scan across a desired area.

2. The UWB radar of claim 1, wherein the substrate comprises a semiconductor wafer.

3. The UWB radar of claim 1, wherein the actuator mechanically scans the UWB radar by rotating the UWB radar about an axis.

4. The UWB radar of claim 1, wherein the actuator mechanically scans the UWB radar by translating the UWB radar across a linear guide.

5. The UWB radar of claim 1, wherein the actuator mechanically scans the UWB radar by rotating an retractable shaft about a pivot, wherein the UWB radar is mounted at one end of the retractable shaft.

6. The UWB radar of claim 1, wherein the RF feed network is implemented using waveguides selected from the group consisting of microstrip waveguides, co-planar waveguides, and planar waveguides.

7. The UWB radar of claim 6, wherein the antennas are adjacent a first surface of the substrate and wherein the RF feed network is a co-planar waveguide network adjacent an opposing surface of the substrate, the plurality of distributed amplifiers being integrated into the opposing surface.

8. The UWB radar of claim 7, wherein the co-planar waveguide network is formed in metal layers adjacent the opposing surface of the substrate.

9. The UWB radar of claim 1, wherein each pulse-shaping circuit includes a driving amplifier operated in a saturation mode so as to rectify and level-shift the globally-synchronized RF signal and drive the resulting rectified and level-shifted RF signal across a plurality of delay lines, each pulse-shaping circuit including a combining amplifier to combine delayed signals from the delay lines into the RF pulses transmitted through the corresponding sub-array of antennas.

10. The UWB radar of claim 1, further comprising:
a receiving network adjacent the substrate, the receiving network configured to receive RF signals from the antennas and provide a combined received RF signal, and
a radar receiver operable to couple the combined received RF signal to a plurality of channels, wherein each channel includes a delay line operable to provide a delayed version of the combined RF signal, a multiplier operable to multiply the delayed version with a replica of the pulses provided by the pulse-shaping circuits to provide a multiplied signal, and an integrate and dump circuit operable to integrate the multiplied signal over multiple cycles of the transmitted pulses to provide an integrated signal; and a combiner for combining the integrated signals into a combined integrated signal.

11. The UWB radar of claim 10, further comprising:
an analog-to-digital converter for digitally converting a version of the combined integrated signal into a digital signal responsive to cycles of an analog-to-digital converter (ADC) clock; and a source for the ADC clock, the source including a coarse timer providing a coarse clock signal to a serially-connected plurality of delay circuits and a multiplexer for selecting from an output signal from each of the delay circuits to generate the ADC clock, whereby driving the multiplexer to select from the appropriate delay circuit on a pulse-by-pulse basis, successive pulses are sampled by the ADC at varying times within each successive sampled pulse.

12. A UWB radar, comprising:
a substrate;
a plurality of antennas adjacent the substrate, the plurality of antennas being arranged into a plurality of sub-arrays;
an oscillator for generating an RF signal
an RF feed network adjacent the substrate, the RF feed network including a feed port for receiving the RF signal from the oscillator, the RF feed network including a distributed plurality of amplifiers integrated with the substrate to amplify the RF signal from the oscillator as the RF signal propagates through the RF feed network;
a plurality of pulse-shaping circuits corresponding to the plurality of sub-arrays, each pulse-shaping circuit being configured to receive an amplified RF signal from the network and to process the amplified RF signal into pulses for transmission through the corresponding sub-array of antennas; and
an actuator for mechanically scanning the UWB radar so that the pulses transmitted by the antennas scan across a desired area.

13. The UWB radar of claim 12, wherein the substrate comprises a semiconductor wafer.

14. The UWB radar of claim 12, wherein the actuator mechanically scans the UWB radar by rotating the UWB radar about an axis.

15. The UWB radar of claim 12, wherein the actuator mechanically scans the UWB radar by translating the UWB radar across a linear guide.

16. A method, comprising:
driving a resonant network of distributed oscillators to produce an globally synchronized output signal having harmonics;
processing a selected one of the harmonics to produce a train of pulses;
transmitting selected ones of the pulses in the train of pulses according to a pulse repetition frequency (PRF);
receiving reflected pulses resulting form the transmission of the selected pulses; and
sampling the received reflected pulses wherein each pulse is arranged from a first portion to a last portion, and wherein each successive sample is delayed from the previous sample such that a sampled portion of a pulse for each sample successively cycles from the first portion to the last portion.

17. The method of claim 16, further comprising: scanning the transmitted pulses across a desired area.

18. The method of claim 17, wherein the scanning comprises a mechanical scanning.

19. The method of claim 17, wherein the scanning comprising an electronic beam steering.

* * * * *